Dec. 6, 1938.   H. C. SMITH   2,139,644
BRAKE MECHANISM
Filed Oct. 24, 1935   2 Sheets-Sheet 1
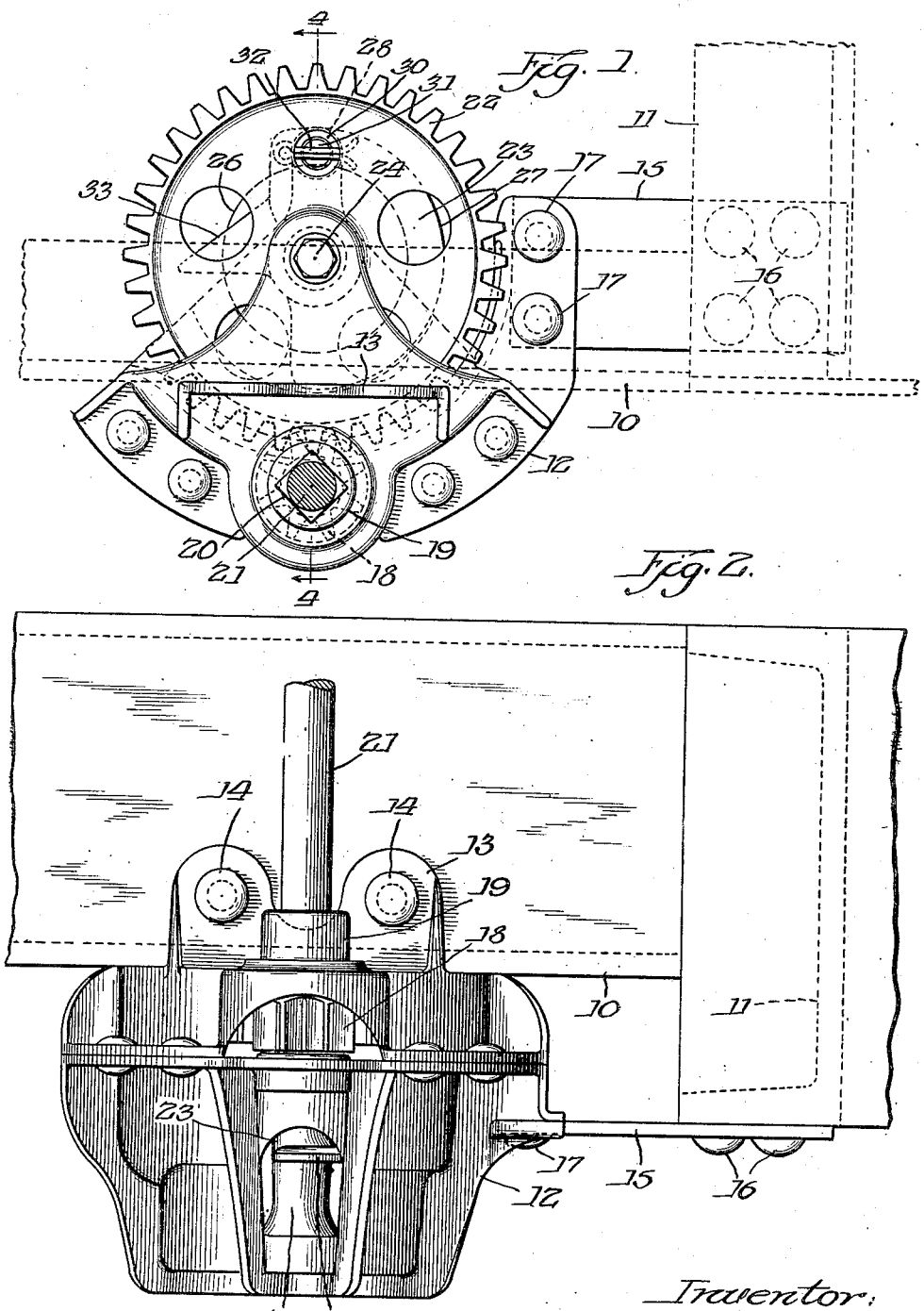
Inventor:
Henry C. Smith Dec. 6, 1938.   H. C. SMITH   2,139,644
BRAKE MECHANISM
Filed Oct. 24, 1935   2 Sheets-Sheet 2

Inventor:
Henry C. Smith
By Wilkinson Huxley Byron & Knight
Attys

Patented Dec. 6, 1938

2,139,644

UNITED STATES PATENT OFFICE 2,139,644

BRAKE MECHANISM

Henry C. Smith, Chicago, Ill., assignor to Superior Hand Brake Co., Chicago, Ill., a corporation of Illinois Application October 24, 1935, Serial No. 46,477

12 Claims. (Cl. 74—505)

My invention relates to a sheave construction for use in hand brake mechanism of the power type for railway cars and has particular reference to a sheave and chain guide in which the chain is normally wrapped around the brake staff or some other form of drum attached to the brake shaft, or to some part of the winding mechanism, and which connects the drum or the like with the brake rod by means of which the brake shoes are drawn into contact with the wheels of the car for braking purposes. The particular form of sheave in my invention is of such a character that the chain will not pile on itself or roll, thus allowing the chain to slip and release the brake mechanism and cause the operator to lose his balance in applying the brakes and ofttimes fall from the car, with the possibility of fatal results or injury to himself.

Another and further object of my invention is the provision of a brake sheave having means by which the chain is attached to the sheave and as the sheave is rotated the chain is wound around the sheave in a regular predetermined position with each winding, and cannot roll or pile upon itself on the sheave so that there is no possibility of the chain rolling or being wrapped in an irregular manner on the sheave.

Another and further object of my invention is the provision of a sheave which is simple in construction, extremely effective in operation and easy and simple to manufacture.

In the operation of the brakes, particularly of the power variety, the operator of the brake in applying it, first takes the slack out of the chain which is adapted to be wound upon the drum or brake staff, and with the forms of power devices now on the market, ordinarily consisting of a gear arrangement having a small gear on the brake staff and a larger gear on the winding mechanism, the chain when winding around the sheave ofttimes piles upon itself in the initial stages of winding, and as the operator or brakeman attempts to put sufficient force upon the brake wheel to cause the brake shoes to effectively engage the wheels to bring the car to a stop, the chain will first pile upon itself and then roll, which in effect releases the brakes and causes slack in the chain thereby often causing the brakeman or operator to lose his balance and slip from the car, often with fatal results. There are often several inches of slack in the brake chain, these power brakes being designed to move the brake lever at least fourteen inches, and on account of the slack in the chain and brake rod it is necessary that the winding sheave take up at least fourteen inches of chain in addition to the slack in the chain and brake rod in applying the brakes, so that it is essential that the brake chain be wound regularly upon the drum or sheave and prevented from piling on itself on the sheave.

My improved brake sheave is designed to cause the chain to be wound upon the brake sheave in a regular manner without piling on the sheave and thereby enabling a quick and certain application of the brakes so that immediately the slack is taken out of the brake the operator can apply sufficient power to the brake shoes through the operating mechanism of the brake to bring the car to a stop.

These and other objects of my invention will be more fully and better understood by reference to the accompanying sheets of drawings, and in which—

Figure 1 is a top plan view of my improved device;

Figure 2 is a fragmentary elevational view of the end of a freight car looking toward the end thereof, showing the housing in position;

Figure 3:
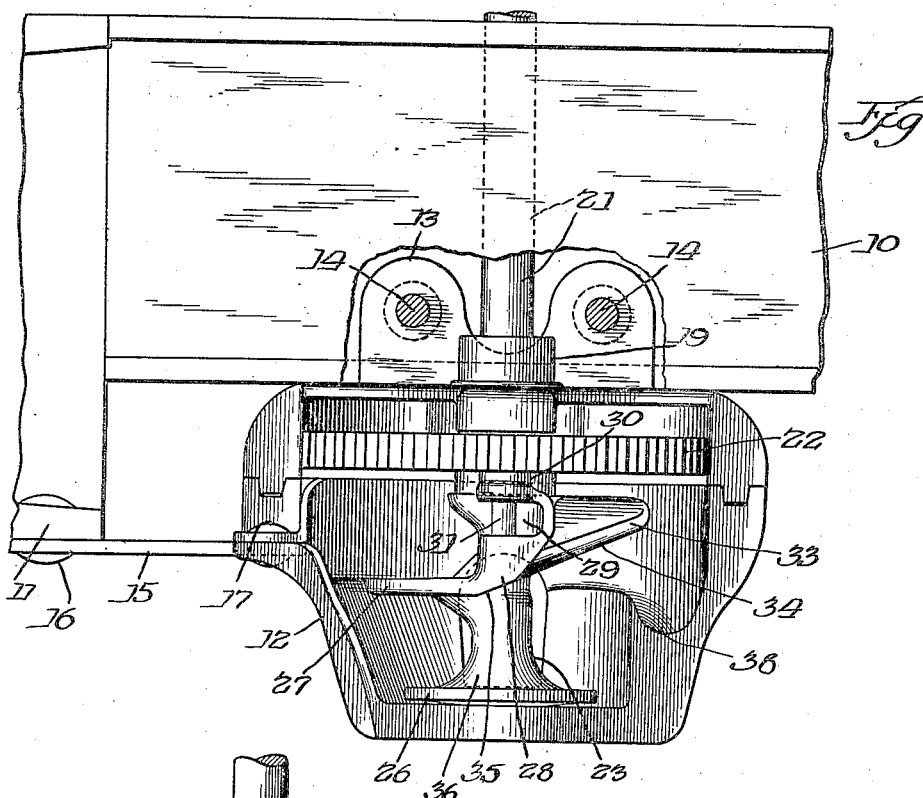
Figure 3 is a view similar to that of Figure 2 except that it is taken from the rear view looking outward toward the front end of the car.
Figure 4:
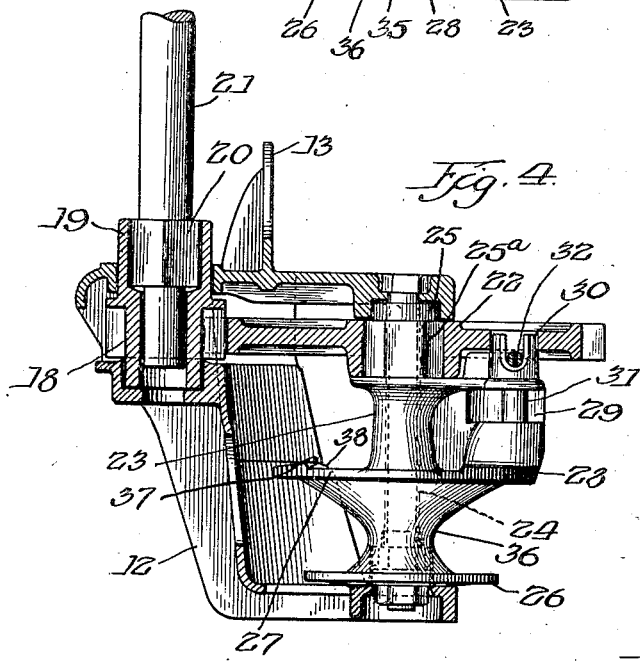
Figure 4 is a vertical sectional view on line 4—4 of Figure 1.

Referring now specifically to the drawings and in which like reference characters refer to like parts throughout, the end sill 10 of a railway car is shown, with a center sill 11 also being shown, with a housing 12 being provided, this housing as shown being formed of upper and lower sections which are riveted together simply as a manufacturing detail to form a unitary structure. From the top of the housing 12 an extension 13 is provided which is adapted to be fitted alongside of the end sill 10 and secured to the end sill by means of rivets 14, 14 in the usual manner. A bracket 15 is also provided which is secured to the center sill 11 by means of rivets 16, 16, which extends across and is secured to one side of the housing 12 by other rivets 17, 17, the housing 12 being thus securely positioned on the end of a railway car.

Mounted in the top of the housing 12 at one side thereof is a small gear 18 having a socket portion 19 integrally formed therewith which is rectangular in shape and is adapted to receive a rectangular shaped portion 20 of the usual brake staff 21. Also mounted in the housing 12 is a large gear wheel 22, this wheel being centrally mounted upon the upper end of the sheave 23.

An axle 24 is provided which extends through the gear wheel 22 and axially of the sheave 23 and the housing 12, the gear wheel 22 and sheave 23 being thereby rotatably mounted in the housing 12 in integral relation with each other, as hereinafter described. The parts, with the exception of the sheave and a special feature of the housing 12 as hereinafter described, are standard parts that are in common use in railway brakes of the power type and my invention has to do particularly with the sheave 23 upon which the chain is wound when the brakes are applied to the car, and the special form of the housing which serves as a guide for the chain.

The sheave 23 has a trunnion 25 at its upper end which extends into a recess formed on the lower side of the upper section of the housing 12, and has a hexagonal portion 25a which is fitted in a corresponding shaped opening in the hub of the gear wheel 22, thereby securing these two members in proper fixed relation with each other. At the lower end of the sheave 23 and integrally formed therewith, is a circular portion 26 which forms a support portion for the brake chain at the lower side of the sheave and prevents the chain from dropping down over the end of the sheave 23. The sheave 23 at its lower end is mounted upon an upwardly extending stepped trunnion integrally formed with the lower section of the housing 12. Intermediate the ends of the sheave 23 and integrally formed therewith is a horizontally extending plate portion 27 which extends a little more than one-half the distance around the sheave 23, and serves as a support for the chain in its initial winding upon the sheave 23.

At one side of the sheave 23 and at the portion above the member 27 is a web portion 28 having a recess 29 formed therein, with a trunnion portion 30 extending upward therefrom which extends into an opening formed in the web of the gear wheel 22. A pin 31 is provided which passes through an opening formed in the web portion 28 and extending only partially therethrough. A cotter pin 32 is provided which extends through the trunnion portion 30 and underneath the web of the wheel 22 at each of its ends so that the pin 31 is prevented from jostling out of its position in the web portion 28, the pin being adapted to pass through the end link of the brake chain and forms a fastening means by which the chain is secured to the sheave 23. In the form shown the distance from the center of the axle 24 to the center of the pin 31 is 2¾ inches, this feature of the structure providing means for the rapid take-up of whatever slack there may be in the brake chain in the initial movement of the sheave 23.

Extending radially from the sheave 23 is a projection 33, this projection having an inclined under side 34 which is in register with an inclined portion 35 on the body of the sheave 23 and which performs the function of guiding the brake chain downwardly toward the bottom of the sheave and into a lower channel 36 extending circumferentially around the sheave 23, with the plate portion 26 extending completely therearound adjacent this channel 36. The plate 27 extends somewhat over half the distance around the sheave 23, and with a somewhat enlarged upper end of the sheave 23 forms an upper channel 37 into which the brake chain is wrapped for approximately three-quarters of a turn of the sheave 23. At one side of the lower section of the housing 12 is provided a channel 38 which extends upwardly and circumferentially of the inner side of the housing 12 and serves to guide the brake chain onto the plate 27 in the initial stages of the winding of the brake chain in the sheave 23.

In operation of the device it will be understood that the end link of the brake chain is placed in the recess 29 and the pin 31 dropped therethrough, with the web portion 28 extending in a direction parallel to the line of direction of the brake chain. When the brake shaft 21 is rotated, always in a clockwise direction, the gear 18 will also be turned in a clockwise direction, resulting in the large gear 22 being turned in a counterclockwise direction. As the chain is drawn taut it will be drawn in a line extending from the point of anchorage on the brake rod to the point of connection of the sheave, this line being parallel, of course, with some point of the sheave 23 and as the slack is taken up out of the chain it winds around the upper section of the sheave 23 and into the channel 37 for approximately three-fourths of a turn until the chain comes in contact with the inclined surface 34 of the projection 33, when it is forced down into the lower channel 36 of the sheave 23. When the sheave 23 has made approximately one-quarter of a turn in its initial movement, the brake chain will of course be in alignment with the pin 31 in which position the chain will be in the channel 38 in the housing 12. As the sheave continues to rotate and the brake chain is drawn more taut, the brake chain will ride upward over the housing, forcing the inner marginal edge of the channel 38 into the plate portion 27 of the sheave 23. In this manner the chain is effectively threaded upon the sheave 23 so that it is in contact therewith at all times and will not pile upon itself and roll from this piled position as it is drawn around the sheave 23. At some point, probably about one complete turn of the sheave 23 with one complete wrap around the sheave, the slack is drawn out of the chain and a further application of force results in drawing the chain tight and effectively applying the brake shoes to the wheels of the car so that in practice less than two complete wrappings of the chain around the sheave 23 are required to effectively apply the brakes to the railway car, so that at no time does the chain pile on the sheave even though it may be necessary to take up a total of eighteen or twenty inches of chain on the sheave in order to effectively apply the brakes.

In this manner, of course, the chain does not at any time pile upon itself, it being understood that after the brakes are applied the brake wheel is held by a suitable ratchet and pawl mechanism, usually within the control of the operator, adjacent the brake wheel. When this mechanism is released the chain is unwound from the drum, the brakes are released, and the mechanism is turned so that the anchorage point of the chain is again in alignment with the brake rod or at some point near thereto in position where the brake mechanism can be operated when necessary.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A winding mechanism for railway car brakes comprising, in combination, a housing, gear means adapted to cooperate with brake operating mechanism, a rotatably mounted sheave in operative connection with said gear means having a plurality of chain receiving channels therein and chain attaching means thereon and having a plate intermediate its ends extending partially therearound, the said sheave having a radially extending portion on the opposite side thereof from said plate having an inclined lower surface, the said housing having a brake chain guide channel therein at one side thereof extending inward and upward on the inner side of said housing.

2. A winding mechanism for railway car brakes comprising, in combination, a housing, gear means adapted to cooperate with brake operating mechanism, a rotatably mounted sheave in operative connection with said gear means having a plurality of chain receiving channels therein and chain attaching means thereon and having a plate intermediate its ends extending partially therearound, the said sheave having a radially extending portion on the opposite side from said plate and at a slightly higher level, the radially extending portion having an inclined lower surface, the said housing having a brake chain guide channel therein at one side thereof extending circumferentially of the said housing on the inner side thereof.

3. A winding mechanism for railway car brakes comprising, in combination, a housing, gear means adapted to cooperate with brake operating mechanism, and a rotatably mounted sheave in operative connection with said gear means having a chain receiving channel therein and chain attaching means thereon, the housing having a channel in the inner contour thereof extending circumferentially of the inner contour of said housing.

4. A winding mechanism for railway car brakes comprising, in combination, a housing, gear means adapted to cooperate with brake operating mechanism, and a rotatably mounted sheave in operative connection with said gear means having a chain receiving channel therein and chain attaching means thereon, the housing having a channel in the inner contour thereof extending circumferentially of the inner contour of said housing, the entrance to said channel being at a lower level than the upper chain receiving channel on said sheave.

5. A winding mechanism for railway car brakes comprising, in combination, a housing, gear means adapted to cooperate with brake operating mechanism, a rotatably mounted sheave in operative connection with said gear means having a plurality of chain receiving channels therein and having a plate intermediate its ends extending partially therearound, the housing having a channel in the inner contour thereof extending circumferentially of the housing a partial distance therearound.

6. A winding mechanism for railway car brakes comprising, in combination, a housing, gear means adapted to cooperate with brake operating mechanism, and a rotatably mounted sheave in operative connection with said gear means having a plurality of chain receiving channels therein and having a plate intermediate its ends extending partially therearound, the housing having a channel in the inner contour thereof extending circumferentially of the housing a partial distance therearound, the said housing being open at one side and wider in a transverse direction through the portion adjacent the initial winding operation of the sheave than at the opposite portion of said sheave and having a projecting wall between the two sections of the housing.

7. A winding mechanism for railway car brakes comprising, in combination, a housing, gear means adapted to cooperate with brake operating mechanism, a rotatably mounted sheave in operative connection with said gear means having a plurality of chain receiving channels therein and chain attaching means thereon and having a plate intermediate its ends extending partially therearound and a radially extending portion on the opposite side of said sheave from said plate, the radially extending portion having an inclined lower surface, the said housing having a brake chain guide channel therein at one side thereof extending circumferentially of the said housing on the inner side thereof, the said housing being open at one side and having a circumferentially extending channel in the inner contour thereof, the entrance of said channel being at one side of the housing and on an approximate level with the plate on the sheave.

8. A brake mechanism comprising, in combination, a housing open at one side and wider at its upper portion than at its lower portion, with a portion of said housing forming a wall in the inner side thereof at one side of said housing and extending circumferentially of said housing a partial distance therearound, a sheave in said housing having a plate portion intermediate its ends and extending partially therearound, the upper side of said plate portion being substantially in register with the upper side of the circumferentially extending wall portion, chain anchoring means on said sheave, a gear in said housing connected to said sheave, and operating means connected to said gear.

9. A brake mechanism comprising, in combination, a housing open at one side and wider at its upper portion than at its lower portion, with a portion of said housing forming a wall in the inner side thereof at one side of said housing and extending circumferentially of said housing a partial distance therearound, a sheave in said housing having a plate portion intermediate its ends and extending partially therearound, the upper side of said plate portion being substantially in register with the upper side of the circumferentially extending wall portion, the sheave having a member projecting radially therefrom on the side opposite the plate slightly higher in location than the said plate, chain anchoring means on said sheave, a gear in said housing connected to said sheave, and operating means connected to said gear.

10. A winding mechanism for railway car brakes comprising, in combination, a housing, gear means adapted to cooperate with brake operating mechanism, and a rotatably mounted sheave in operative connection with said gear means having a chain receiving channel therein and chain attaching means thereon and having a plate intermediate its ends extending partially therearound and having a chain guide extension portion on the side opposite said plate having an inclined lower surface, the said housing having brake chain guide means on the inside thereof adapted to guide the brake chain onto the said plate during the initial winding operation.

11. Winding mechanism for railway brakes comprising, in combination, a housing open at one of its sides, a rotatably mounted sheave in said housing having a chain receiving channel therein and chain attaching means thereon, a gear in fixed relation with said sheave, and a gear adapted to be actuated by the brake shaft and cooperating with said first mentioned gear, the said housing having guide means on the inner surface thereof for initially guiding the brake chain onto the said sheave.

12. Winding mechanism for railway brakes comprising, in combination, a housing open at one of its sides and of substantially semi-circular contour on its inner side with an offset portion intermediate its top and bottom, a rotatably mounted sheave in said housing having a chain receiving channel therein and chain attaching means thereon, a gear in fixed relation with said sheave, and a gear adapted to be actuated by the brake shaft and cooperating with said first mentioned gear, the said offset portion serving to support and guide the brake chain during the initial winding thereof.

HENRY C. SMITH.